United States Patent [19]

Baginski

[11] 3,831,979

[45] Aug. 27, 1974

[54] STEERING ASSEMBLY

[75] Inventor: Martin R. Baginski, Austinburg Township, Ohio

[73] Assignee: Ashtabula Bow Socket Company, Ashtabula, Ohio

[22] Filed: Nov. 4, 1971

[21] Appl. No.: 195,620

[52] U.S. Cl. .............................. 280/279, 280/280
[51] Int. Cl. ........................................ B62k 21/04
[58] Field of Search .......... 280/279, 280, 281, 274, 280/288

[56] References Cited
UNITED STATES PATENTS

| | | | |
|---|---|---|---|
| 463,329 | 11/1891 | Cottle | 280/279 |
| 587,984 | 8/1897 | Matthews | 280/280 |
| 589,147 | 8/1897 | Sturges | 280/280 |
| 668,546 | 2/1901 | Sutherland | 280/279 |
| 1,883,033 | 10/1932 | Snell | 280/279 |
| 2,384,968 | 9/1945 | Schwinn | 280/279 X |
| 2,561,710 | 7/1951 | Pawsat | 280/279 |
| 3,260,535 | 7/1966 | Jaulmes | 280/279 |

FOREIGN PATENTS OR APPLICATIONS

| | | | |
|---|---|---|---|
| 14,789 | 1910 | Great Britain | 280/280 |

*Primary Examiner*—Kenneth H. Betts

[57] ABSTRACT

This disclosure relates to a steering assembly for supporting the wheel of a wheeled vehicle for steering movement relative to the frame of the vehicle. The steering assembly includes a tubular member having a central portion, end portions for supporting the wheel of the wheeled vehicle and corner portions connecting the end portions to the central portion. Each of the end portions of the tubular member are formed at an angle with respect to the central portion. The one piece tubular member has continuous inner and outer surfaces along the extent of the corners. The corners have gusset means for reinforcing the corner portions to resist deformation thereof. The central portion of the tubular member has an opening therethrough for receiving the post. The steering assembly also provides means for securing the post to the tubular member. The opening in the tubular member has a portion thereof defined by a surface which is continuous with the outer surface of the central portion. The steering assembly also includes a cap which has an inner surface positioned adjacent to the outer surface of the central portion of the tubular member. The cap has an opening therethrough which is coaxial with the opening of the tubular member and is defined by a post receiving surface continuous with the inner surface of the cap. The cap has an outer surface portion for receiving bearing means thereon to provide a rotational mounting between the wheeled vehicle frame and the steering assembly.

16 Claims, 7 Drawing Figures

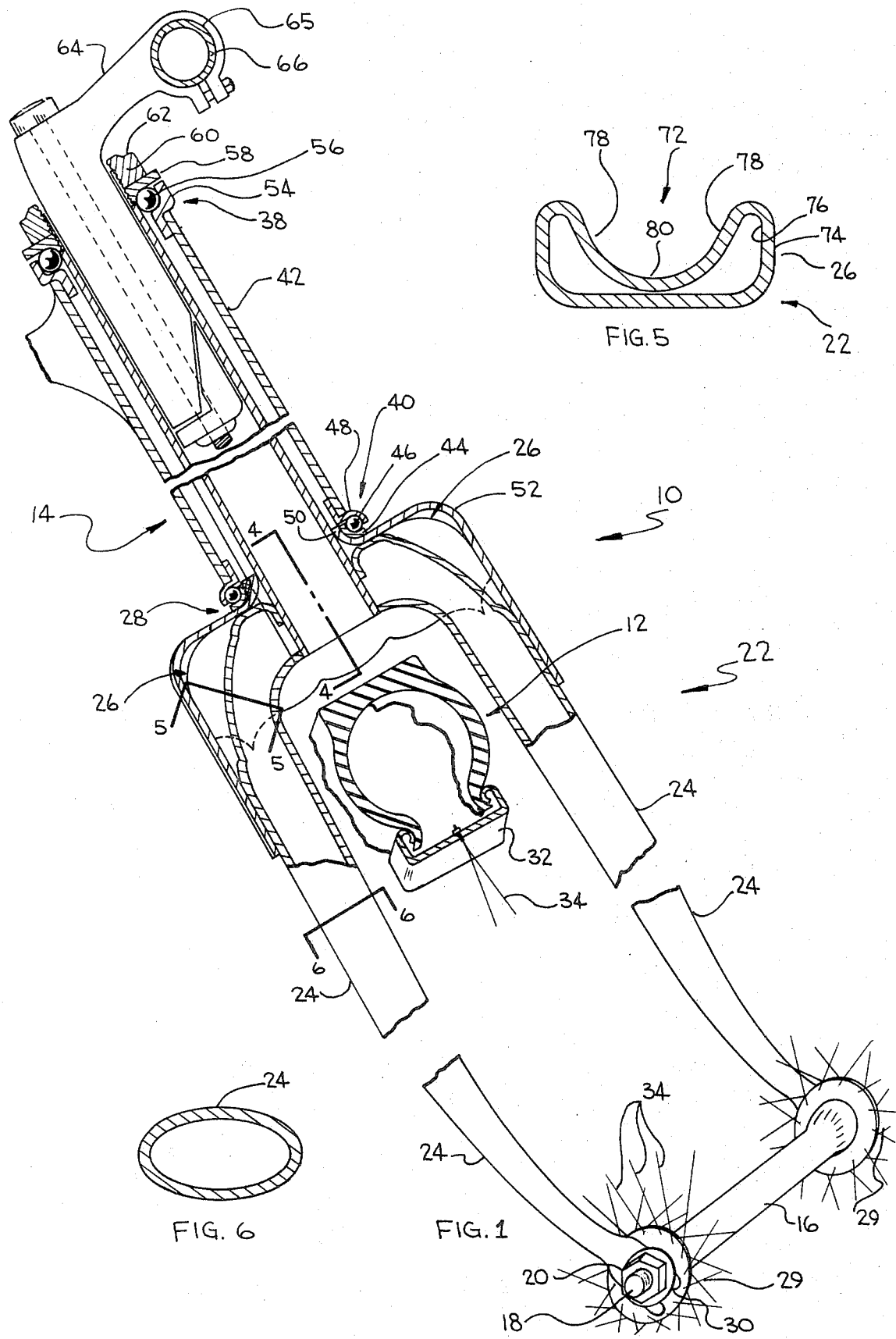

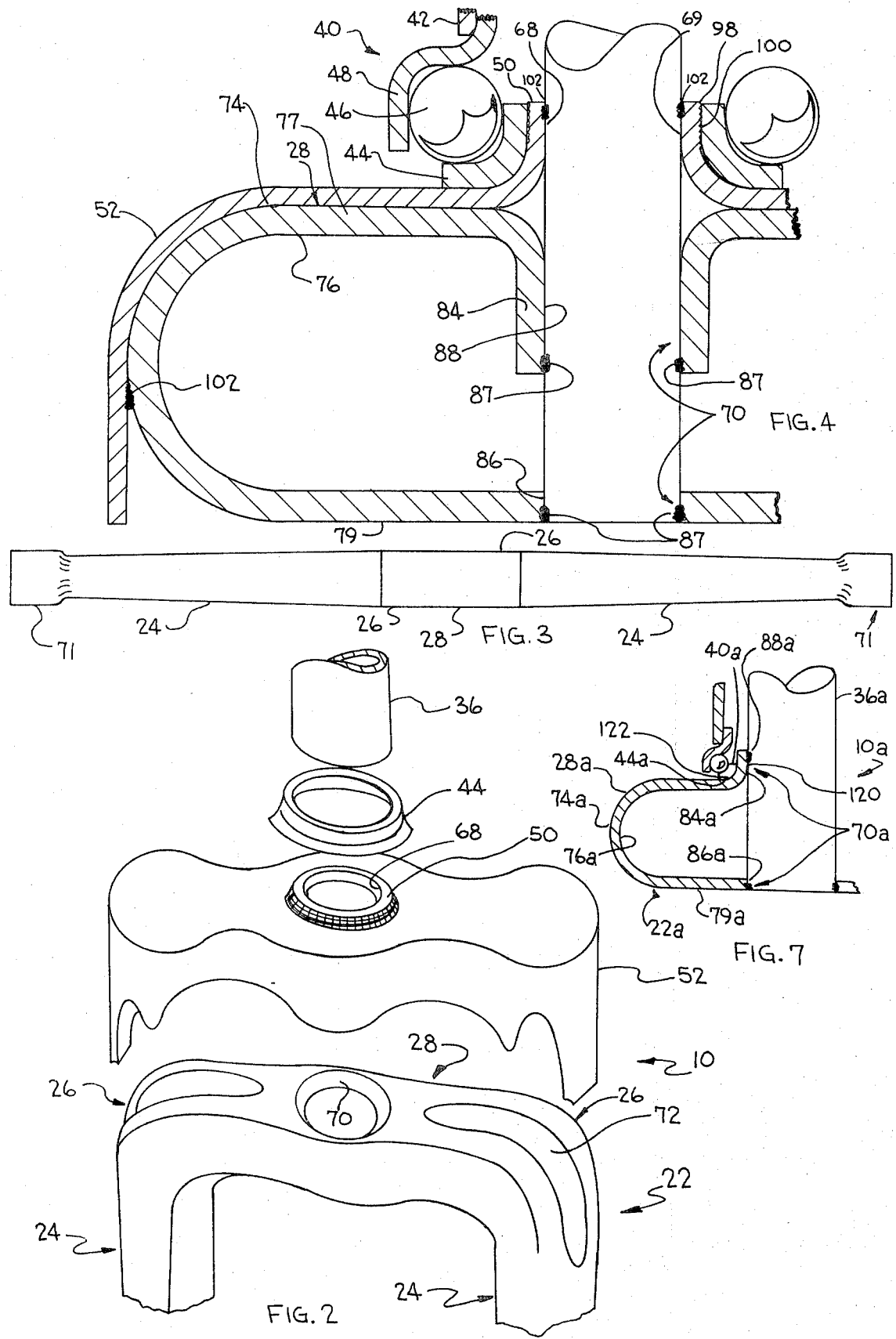

STEERING ASSEMBLY

The present invention relates to a steering assembly and more particularily to a steering assembly for supporting the wheel of the wheeled vehicle for steering movement relative to the frame of the vehicle.

Yet more particularily, the steering assembly of the present invention relates to a steering assembly having a one piece tubular member, a cap and a post. The tubular member is formed into a fork of a generally U-shaped configuration. The post is secured to the central portion of the fork-shaped tubular member and the cap has an opening to receive the post therein and allows the cap to be positioned over the central portion of the tubular member.

The fork-shaped tubular member of the present invention has a continuous surface along the corner portions connecting the central portion to the end portions of the fork-shaped member. The corner portions have gusset means which provide for reinforcement of the corners to resist deformation of the tubular member when the steering assembly of the present invention is in use. The gusset means and tubular shape of the corners significantly increases the strength of the steering assembly and allows significant impact forces to be exerted thereon while remaining in alignment. An additional advantage of using the tubular fork member of the present invention is that a light-weight steering assembly is provided as required by the current trend toward light-weight construction without sacrificing but rather increasing the strength of the steering assembly.

To provide an improved connection between the post and the tubular member, an opening through the central portion of the tubular member is provided to receive the post therein. This opening flange is partially defined by a surface which is continuous with either the inner or outer surface of the central portion of the tubular portion of a flange portion of the tubular member. The post extends through the opening and is in contact with the continuous surface of the opening and also engages both sides of the tubular member. Since the contact surface of the tubular member with the post is thereby increased, further rigidity in the connection between the tubular member and the post is obtained. It should also be noted that if the extruded portion of the opening is made on the side of the tubular member that the post enters, a simplified assembly process is provided.

After the post is inserted into the opening of the tubular member, the post is secured to the tubular member by brazing, welding, high strength adhesives, friction or other conventional means well known to those skilled in the art. This method of securing the post to the tubular member provides a steering assembly having increased strength in the connection between the post and the tubular member.

One example of the need for such increased strength occurs when the wheeled vehicle is driven over a curb. When the vehicle goes over a curb, impact forces are exerted on a wheel and are in turn transmitted to the tubular member. These impact forces tend to twist the tubular member off of the post and thereby break the connection between the post and the tubular member. The additional strength of the connection between the post and the tubular member of the present invention increases the resistance to such a separation.

The steering assembly of the present invention provides a cap which covers the central portion of the tubular member and also at least a portion of the corners. The cap has an inner surface which is positioned adjacent to the outer surface of the central portion of the tubular member and has an opening therethrough for receiving the post therein. The opening in the cap is coaxial with the opening in the tubular member and is defined by a post receiving surface continuous with the inner surface of the cap.

Since the steering assembly is rotatably mounted on the frame of the wheeled vehicle with which it is used, bearing means are provided between the frame and the steering assembly. The bearing means may include any conventional bearing well known to those skilled in the art, such as a bearing having two races and balls positioned therebetween. One of the races is fixidly received by the steering assembly and the other is fixidly received by the frame. Thus, relative rotation is effected between the steering assembly and the frame of the wheeled vehicle.

To provide an easy and effective assembly of one of the bearing races to the steering assembly, the cap of the present invention is provided. The cap is slid over the post through the opening in the cap until the cap contacts the tubular member. The cap has an inner surface adjacent to the outer surface of the central portion of the tubular member. The opening in the cap is defined by a surface which is continuous with the inner surface of the cap which in effect forms a flange on the cap extending away from the tubular member. This flange portion of the cap has an outer surface for receiving one of the bearing races thereon. Since the outer surface portion of the flange has a greater diameter than the outside diameter of the post, the bearing race may easily be slid over the post and pressed into contact with the cap which in turn forces the inner surface of the flange portion of the cap into the post to aid in the securement of the cap to the post and the tubular member.

It should also be understood that the cap serves the purpose of enhancing the appearance of the tubular member by concealing the gussets formed in the corners.

To further increase the rigidity of the steering assembly, means are provided for connecting the cap to the tubular member and post. Such means may include welding, brazing, high strength adhesive, friction or any other means well known to those skilled in the art. By making the cap integral with both the tubular member and the post, a steering member having increased strength is provided.

It is an object of the present invention to provide a steering assembly for supporting the wheel of the wheeled vehicle for steering movement relative to the frame of the vehicle which is light weight in construction and has increased strength characteristics.

It is another object of the present invention to provide a steering assembly for supporting a wheel of a wheeled vehicle for steering movement relative to the frame of the vehicle which includes a tubular member having a fork-shape with gussets in the corners thereof to increase the resistance to deformation thereof.

Yet another object of the present invention is to provide a steering assembly for supporting the wheel of a wheeled vehicle for steering movement relative to the frame of the vehicle which includes a tubular member formed in the shape of a fork for rotatably supporting the wheel of the wheeled vehicle and having an opening in the central portion thereof which opening is defined at least in part by a flange portion of the tubular member and which opening receives the post therein for providing a connection of the increased strength between the post and the tubular member.

A further object of the present invention is to provide a steering assembly for supporting the wheel of a wheeled vehicle for steering movement relative to the frame of the vehicle which steering assembly includes a cap having a flange portion thereon which flange is adapted to receive one of the races of the bearing means interconnecting the steering assembly to the frame of the steering vehicle to thereby provide for easy assembly thereof.

Yet a further object of the present invention is to provide a steering assembly for supporting the wheel of a wheeled vehicle for steering movement relative to the frame of the vehicle wherein the steering assembly includes a tubular member formed in the shape of a fork having a central portion, a post which is secured to the central portion of the tubular member and a cap which is secured to the post and the tubular member to provide for increased strength thereof and for concealing the gussets formed in the corner portions of the fork.

Further object and advantages of the present invention will be apparent to those skilled in the art to which it relates from the following detailed description of the preferred embodiment thereof made with reference to the accompanying drawings forming a part of this specification and in which;

FIG. 1 is a sectional view of an upper and lower section of the steering assembly of the present invention mounted in the frame of a wheeled vehicle with the lower section rotated with respect to the upper section;

FIG. 2 is an exploded perspective view of a portion of the steering assembly shown in FIG. 1;

FIG. 3 is a side elevational view of a tubular blank for manufacturing the steering assembly shown in FIGS. 1 and 2;

FIG. 4 is a cross sectional view of the steering assembly shown in FIG. 1 and taken along line 4—4 thereof;

FIG. 5 is a cross sectional view of a portion of the steering assembly shown in FIG. 1 taken along line 5—5 thereof;

FIG. 6 is a cross sectional view of a portion of the steering assembly shown in FIG. 1 taken along line 6—6 thereof; and FIG. 7 is a cross sectional view of a portion of another embodiment of the steering assembly of the present invention.

The present invention provides a steering assembly for supporting the wheel of a wheeled vehicle for steering movement relative to the frame of the vehicle. In addition, the present invention provides a steering assembly with increased strength for increased resistance to deformation of the steering assembly when in use. The present invention also provides a steering assembly wherein the rotational mounting of the steering assembly to the frame of the wheeled vehicle is more easily effected. The present invention may be applied to steering assemblies for supporting the wheel of a wheeled vehicle for steering movement relative to the frame of the vehicle of a wide variety of constructions and designs. For purposes of illustration, one representative design is shown in the drawings as applied to the steering assembly 10 as shown in FIG. 1.

The steering assembly 10 shown in FIG. 1 is used to support the wheel, schematically shown at 12, of a wheeled vehicle having a frame, the front portion of which is indicated at 14. The wheel 12 has a hub 16 having an axle 18. The rim 32 of the wheel 12 is connected to the hub 16 by means of spokes 34. The hub 16 allows for relative rotation of the wheel 12 with respect to the axle 18 and consequently the steering assembly 10. Threaded fasteners 20 are provided to threadedly engage each of the ends of the axle 18.

The steering assembly 10 includes a tubular member, generally indicated at 22, which defines a generally fork-shaped member having tines or end portions 24, corner portions 26 and a central portion, generally indicated at 28. Slots 30 are provided in the ends 29 of each of the tines or end portions 24. The axle 18 is received in the slots 30 and clamped therebetween by means of the threaded fasteners 20 in a manner well known to those skilled in the art.

An essential feature of any steering assembly is to allow for steering movement relative to the frame 14 of the vehicle. By allowing such steering movement or rotation of the wheel 12 with respect to the wheeled vehicle, the direction in which the wheeled vehicle moves may be determined. To provide for such steering movement, the steering assembly 10 of the present invention provides a post 36 rotatably secured by the upper and lower bearing means 38, 40 respectively to the tubular member or fork 22 as will be hereinafter described.

The lower bearing means 40 includes an inner race 44, a series of balls 46 and an outer race 48. The outer race 48 is press fitted into the inside of the frame tube 42 and thus is secured thereto. The inner race 44 is press fitted over a flange portion 50 of the cap 52 of the steering assembly 10 and thus is secured to the steering assembly, as will hereinafter be more fully described. Thus it is apparent that the bearing means 40 allows for rotation of the post 36 with respect to the frame tube 42 but prohibits upward movement to the steering assembly 10 with respect to the frame 14.

The upper bearing means 38 includes an outer race 54 which is press fitted into the frame tube 42 in a manner similar to that described in connection with outer race 48 of the lower bearing 40. The upper bearing 38 includes a plurality of balls 56 disposed about the periphery of the outer race 54. The upper bearing 38 also includes an inner race 58 which is threadedly engaged with the threaded upper portion 60 of the post 36. The inner race 58 is moved axially on the threads 60 of the post 36 by rotation relative to the post until it contacts the ball bearings 56 located in the outer race 54.

At this point, the downward movement of the post 36 is prohibited by the bearing 38 while allowing for rotation of the post with respect to the frame tube 42. A lock nut 62 is provided to lock the bearing race 58 with respect to the post 36. Thus, the steering assembly 10 is rotatably mounted with respect to the frame 14 while relative axial movement between the post 36 of the steering assembly 10 and the frame 14 is prohibited.

To effectuate steering rotation of the steering assembly 10 with respect to the frame 14, a conventional handle bar stem, generally indicated at 64, is provided inside of the post 36. The stem 64 is fixidly connected to the post 36 in any well known manner. It should be noted that the upper section of FIG. 1 is rotated with the lower section to more clearly show the present invention. The stem 64 includes an opening 65 therein for receiving a handle bar, shown in cross section at 66.

To provide for steering movement of the steering assembly 10, the rider of the wheeled vehicle grips the handle bar 66, and turns the handle bar. The steering assembly 10 is rotated and the direction in which the vehicle will move is determined.

An exploded and enlarged perspective view of a portion of the steering assembly 10 of the present invention is shown in FIG. 2. FIG. 2 shows the post 36 in alignment with the coaxial openings 68 in the cap 52, and 70 in the tubular member 22. The post 36 is received in the openings 68, 70 when in an assembled position as will hereinafter be more fully described.

The tubular member 22 is manufactured from a tube having a uniform inner and outer diameter. Preferably, the tubular member 22 is formed by the method and apparatus shown in my copending application for a Method and Apparatus for Forming a Blank, Ser. No. 66,229 filed Aug. 24, 1970 now U.S. Pat. No. 3,727,445, assigned to the assignee of the present invention. This method and apparatus provides a tubular blank having uniform walls throughout its length as shown in FIG. 3. The tube may also be formed in any manner well known to those skilled in the art, such as swaging, into a tubular blank having the shape shown in FIG. 3. The central portion 28 and corner portion 26 of the tubular blank remain at the original diameter of the tube and the tines or end portions 24 are formed into a tapered portion. The ends 71 of the end portions 24 remain at the original diameter.

The tubular blank, shown in FIG. 3, is then flattened to provide an oval cross section throughout the entire length of the blank. A typical oval section of the end portions 24 is shown in FIG. 6. It should be understood that the size of the cross section of the end portion 24 decreases towards the ends 71 but is similar to that shown in FIG. 5. Simultaneous with this flattening step, the reinforcing gussets 72 are formed in the corner portions 26 of the tubular blank and the ends 71 of the tines 24 are flattened together.

The tubular blank is then formed into a fork-like shape or U-form so that the end portions 24 are formed at an angle with respect to the central portion 28 with the corner portions 26 innerconnecting the central portion 28 and end portions 24. It should be understood that the angle at which the end portions are formed with respect to the central portion 28 allows the ends 71 of the end portions 24 to be spread so that the distance thereacross is greater than the distance across the central section. The opening 70 as will hereinafter be described is then formed in the tubular member 22 and the end portions 24 are then bent forwardly in any known manner.

As described hereinabove, the corner portions 26 of the tubular member 22 have gussets 72 therein. The gussets 22 are formed primarily to provide increased strength in the corner portions 26. When forces are exerted on the steering assembly 10 by contact of the wheel 12 on an irregular surface, deformation of the tubular member 22 will be resisted by the gussets 72. An additional advantage of the gussets 72 is that the formation of the tubular member 22 into a fork-shape is assisted by the gussets.

The gussets 72 may be formed by any conventional means well known to those skilled in the art, such as a forming die. FIG. 5 shows a cross section of the corner portion 26 of the tubular member 22. The corner portions 26 have an outer surface, generally indicated at 74, and an inner surface 76, which are both continuous throughout the tubular member 22. The gusset 72, shown in FIG. 6, defines a valley or trough having side portions 78 and a bottom portion 80. Since the inner and outer surfaces 76, 74 respectively are continuous about the entire gusset 72, there are no discontinuities which tend to interupt the distribution of stresses across the corner section 26 when force is applied thereto. This enhances the strength of the corner section 26 which of course requires significant strength to resist deformation by forces exerted on the steering assembly 10.

It should be clearly understood that the gussets 72 may include other geometric configurations other than that shown in FIG. 5 and in addition may be formed on any side of the corner portion 26 which will increase the strength of the corner portion. For example, the present invention contemplates the use of a series of valleys formed in the corner portion 26 of the tubular member 22 which increases the strength of the corner portion. The gussets are continuous with the corner portions 26 and join the central portion 28 to the end portion 24 in a smooth even manner to provide for an even stress distribution.

The present invention provides an improved connection of the tubular member 22 to the post 26. An opening 70 is provided in the central portion 28 of the tubular member 22 for receiving the post 36 therein. The opening 70 is defined by upper and lower portions 84, 86 respectively. The central portion 28 of the tubular member 22 has continuous inner and outer surfaces 76, 74 respectively, throughout its extent, with the exception of the opening 70.

The upper portion or flange 84 of the opening 70 is formed by extruding the material of the central portion 28 as seen in FIG. 4. The upper portion or flange 84 is extruded inwardly through the upper wall 77 of the tubular member 22 towards the inner surface 76 and includes a surface 88 continuous with the outer surface 74 of the central portion 28. The surface 88 provides an elongated surface to provide an increased contact area between the tubular member 22 and the post 36. The lower portion 86 is simply pierced through the lower wall 79 of the central portion 28. It should be understood that either the upper or lower portions 84, 86 may be extruded inwardly or outwardly in order to provide a flange having a surface which increases the area of the tubular member 22 in contact with the post 36. The contact surface 88 defining the upper portion 84 of the opening 70 is continuous with the outer surface 74 of the tubular member 72. It should be understood that such a contact surface may also be continuous with the inner surface 76.

The present invention contemplates forming flanges in both the upper and lower portions 84, 86 to provide for increased contact between the tubular member 22 and the post 36.

An additional advantage of the strength imparted by such a design is that there is both an upper and lower portion 84, 86 in contact with the post 36 which portions are connected by a continuous metal section. Since there is significant separation between the upper and lower portions 84, 86 respectively of the opening 70, the post 36 is supported over a greater length and the total distance which supports the post 36 is increased thereby. Such a design significantly increases the strength of the connection between the post 36 and the tubular member 22.

To rigidly retain the post 36 in the opening 70 of the tubular member 22, the size of the opening 70 may be such that the post 36 is press fitted therein. Any other conventional means of rigidly securing the post 36 to the upper and lower portions 84, 86 respectively of the openings 70 may be utilized such as welding 87, brazing, or high strength adhesive.

The cap 52 of the steering assembly 10 is positioned adjacent to the corner portions and center portion 26, 28 respectively of the tubular member 22 to conceal the gussets 72 and thus enhance the appearance of the steering assembly 10. The cap 52 also serves a function providing a device which allows the inner race 44 of the bearing means 40 to be secured to the steering assembly as hereinafter described.

The cap 52 has an inner surface which is adjacent to the outer surface 74 of the tubular member 22 as seen in FIG. 4. The flange 50 of the cap 52 includes a post receiving surface 69 which defines the opening 68 of the cap 52. The surface 69 is continuous with the inner surface 94 of the cap 52 and extends upwardly towards the bearing means 40. The outer surface portion 98 adjacent to the post receiving surface 68 is formed to frictionally engage the inner race 44 of the bearing means 40, as seen in FIG. 4. The surface 98 has knurls 100 formed thereon to increase the frictional engagement of the inner race 44 with the cap 52. It should be understood that the present invention also contemplates any means which provides for the secure engagement of the inner race 44 to the cap 52.

When the inner race 44 is assembled with the steering assembly 10, it can be seen that since the surface 98 has a diameter greater than that of the tube 36, the inner race 44 may be easily slid over the post 36 and frictionally engage the cap 52 of the steering assembly 10. This allows for easy assembly of the inner race 44 to the steering assembly 10 without requiring close tolerences. When the inner race is pressed onto the cap 52, the post receiving surface 69 is restricted to increase the strength of the connection between the cap 52 and the post 36.

The cap 52 may also be used to provide additional strength to the connection between the post 36 and the tubular member 22. Any conventional securing means 102 well known to those skilled in the art such as welding, brazing, high strength adhesives, or frictional fitting of the parts, may be used to join the cap 52 to the post 36 and also to the tubular member 22 to thereby provide a unitized structure having increased strength.

A partial cross sectional view of another embodiment of the steering assembly of the present invention is shown in FIG. 7 and is similar in construction to the assembly 10 shown in FIGS. 1–6 for ease of description common parts will be given common numerals with the suffix a appended thereto.

The steering assembly 10a of the present invention provides an improved connection of the tubular member 22a to the post 26a. An opening 70a is provided in the central portion 28a of the tubular member 22a for receiving the post 36a therein. The opening 70a is defined by upper and lower portions 84a, 86a respectively. The central portion 28a of the tubular member 22a has continuous inner and outer surfaces 76a, 74a respectively, throughout its extent, with the exception of the opening 70a.

The upper portion or flange 84a of the opening 70a is formed by extruding the material of the central portion 28a as seen in FIG. 7. The upper portion or flange 84a is extruded outwardly towards the outer surface 74a and includes a surface 88a continuous with the inner surface 76a of the central portion 28a. The surface 88a provides an elongated surface to provide an increased contact area between the tubular member 22a and the post 36a. The lower portion 86a is simply pierced through the lower wall 79a of the central portion 28a.

An additional advantage of the strength imparted by such a design is that there is both an upper and lower portion 84a, 86a in contact with the post 36a which portions are connected by a continuous metal section. Since there is significant separation between the upper and lower portion 84a, 86a respectively of the opening 70a, the post 36a is supported over a greater length and the total distance which supports the post 36a is increased thereby. Such a design significantly increases the strength of the connection between the post 36a and the tubular member 22a.

To rigidly retain the post 36a in the opening 70a of the tubular member 22a, the size of the opening 70a may be such that the post 36a is press fitted therein. Any other conventional means of rigidly securing the post 36a to the upper and lower portions 84a, 86a respectively of the openings 70a may be utilized such as welding 87a, brazing, or high strength adhesive.

The tubular member 22a also serves the function of providing a device which allows the inner race 44a of the bearing means 40a to be secured to the steering assembly. The outer surface portion 122 adjacent to the post receiving surface 88a is formed to frictionally engage the inner race 44a of the bearing means 40a, as seen in FIG. 7. The surface 122 has knurling formed thereon to increase the frictional engagement of the inner race 44a with the tubular member 22a. It should be understood that the present invention also contemplates any means which provides for the secure engagement of the inner race 44a to the tubular member 22a.

It is apparent from above that the present invention provides a steering assembly 10 for supporting the wheel 12 of a wheeled vehicle for steering movement relative to the frame 14 of the vehicle. The steering assembly 10 includes a cap 52, a post 36 and a one piece tubular member 22. The tubular member has a central portion 28, end portions 24 for supporting the wheel 12 to the central portion 28. The tubular member 22 of the continuous inner and outer surface has continuous inner and outer surfaces along the extent of the corner portions 26. The corner portions 26 have gusset means 72 for reinforcing the corners to resist deformation thereof. The central portion of the tubular member 22 has an opening 70 therethrough for receiving post 36 therein. The steering assembly 10 also includes means for securing the post in the opening of the tubular member. The cap 52 has an inner surface 94 positioned adjacent to the outer surface 74 of the tubular member 22. The cap 52 has an opening 68 therethrough for receiving post 36 therein. The opening 68 of the cap 52 is coaxial to the opening 70 of the tubular member 22 and is defined by the post receiving surface 69 continuous with the inner surface 94 of the cap 52. The steering assembly 10 has a surface portion 98 for receiving bearing means 40 thereon to provide a rotational mounting between the wheeled vehicle frame 14 and the steering assembly 10.

Having described my invention I claim:

1. A steering assembly for supporting the wheel of a wheeled vehicle for steering movement relative to the frame of the vehicle comprising a cap, a post and a one piece tubular member, said tubular member having a central portion, end portions for supporting the wheel of the wheeled vehicle, and corner portions connecting said end portions to said central portion, each of said end portions formed at an angle with respect to said central portion, said one piece tubular member having continuous inner and outer surfaces along the extent of said central and corner portions, said corner portions having gusset means for reinforcing said corner portions to resist deformation thereof, said central portion of said tubular member having an opening therethrough for receiving said post therein, said opening having a portion thereof defined by a surface continuous with one of said surfaces of said central portion, said cap having an inner surface positioned adjacent to said outer surface of said central portion of said tubular member, said cap having an opening therethrough for receiving said post therein, said opening of said cap being coaxial with said opening in said tubular member and defined by a post receiving surface continuous with said inner surface of said cap, said cap having an outer surface portion for receiving bearing means thereon to provide a rotational mounting between the wheeled vehicle frame and said steering assembly.

2. A steering assembly as defined in claim 1 wherein said gusset means includes at least one valley formed in said corner portions, said valley extending from said central portion to one of said end portions for reinforcing said corner portions to resist deformation thereof.

3. A steering assembly as defined in claim 1 wherein a portion of said opening in said central portion is defined by a flange formed from the material of the said central portion, said flange providing an increased surface area for retaining said post therein.

4. A steering assembly as defined in claim 1 wherein said opening in said central portion includes an upper and a lower portion thereof, said upper and lower portions connected by the material defining said central portion, said post positioned to contact both said upper and lower portions of said opening to provide a joint therebetween.

5. A steering assembly as defined in claim 4 wherein one of said upper and lower portions includes an aperture through one wall of said central portion of said tubular member and the other portion of said opening in said tubular member includes an extruded portion in the other wall of said central portion of said tubular member.

6. A steering assembly as defined in claim 1 wherein said opening in said cap includes an extruded portion extending toward the bearing means received thereon.

7. A steering assembly as defined in claim 1 including means for securing said cap to said post and said tubular member.

8. A steering assembly as defined in claim 1 wherein the bearing means providing for rotational mounting between the wheeled vehicle frame and said steering assembly includes a pair of races, one of the races frictionally engaged by said outer surface portion of said cap.

9. A steering assembly as defined in claim 1 wherein said outer surface portion of said cap for receiving the bearing means thereon has a knurled surface.

10. A steering assembly for supporting the wheel of a wheeled vehicle for steering movement relative to the frame of the vehicle comprising a post and a one piece tubular member, said tubular member having a central portion including spaced upper and lower wall portions, end portions for supporting the wheel of the wheeled vehicle, and corner portions connecting said end portions to said central portion, each of said end portions formed at an angle with respect to said central portion, said one piece tubular member having continuous inner and outer surfaces along the extent of said corners, said central portion of said tubular member having an opening therethrough for receiving said post therein, said steering assembly including means for securing said post in said opening of said tubular member, said opening in said central portion comprising a flange portion and an aperture, said flange portion formed from the material of one of said upper and said lower wall portions and said aperture defined by the other of said upper and said lower wall portions, said flange portion extending along the axis of said post.

11. A steering assembly for supporting the wheel of a wheeled vehicle for steering movement relative to the frame of the vehicle comprising a cap, a post and a one-piece tubular member, said tubular member having a central portion, end portions for supporting the wheel of the wheeled vehicle, and corner portions connecting said end portions to said central portion, each of said end portions formed at an angle with respect to said central portion, said one-piece tubular member having continuous inner and outer surfaces along the extent of said corners, said corners having gusset means for reinforcing said corners to resist deformation thereof, said gusset means including at least one valley formed in said corner portions, said valley extending from said central portion to one of said end portions for reinforcing said corner portions to resist deformation thereof, said central portion of said tubular member having an opening therethrough for receiving said post therein, said steering assembly including means for securing said post in said opening of said tubular member, said cap positioned adjacent to said tubular member, said cap having an opening therethrough for receiving said post therein, said opening of said cap being coaxial with said opening of said tubular member.

12. A steering assembly for supporting the wheel of a wheeled vehicle for steering movement relative to the frame of the vehicle comprising a post, a one-piece tubular member, and means for connecting said post to said tubular member, said tubular member having a central portion, end portions for supporting the wheel of the wheeled vehicle, and corner portions connecting said end portions to said central portion, each of said end portions formed at an angle with respect to said central portion, said one-piece tubular member having continuous inner and outer surface along the extent of said corners, said corner having gusset means for reinforcing said corners to resist deformation thereof, said gusset means including at least one valley formed in said corner portions, said valley extending from said central portion to one of said end portions for reinforcing said corner portions to resist deformation thereof.

13. A steering assembly as defined in claim 12 wherein said central portion of said tubular member includes an opening therethrough for receiving said post therein, said opening in said central portion including an upper and a lower portion thereof, said upper and lower portions connected by the material defining said central portion, said post positioned to contact both said upper and lower portions of said opening to provide a joint therebetween.

14. A steering assembly as defined in claim 13 wherein a portion of said opening in said central portion is defined by a flange formed from the material of the said central portion, said flange providing an increased surface area for retaining said post therein.

15. A steering assembly for turning the wheel of a bicycle or similar vehicle, said steering assembly comprising a rotatable steering post adapted to be connected with a manually operable steering element, said steering post having an outer side surface which extends axially along said post, and a bifurcated frame having a pair of elongated side portions adapted to be connected with opposite sides of the wheel, said bifurcated frame having a central portion extending between said side portions, said central portion having a first continuous surface circumscribing and disposed in abutting engagement with said outer side surface of said post and a second continuous surface circumscribing said post and coaxial with and spaced axially apart from said first continuous surface, said second continuous surface being disposed in abutting engagement said outer side surface of said post at a location axially spaced apart from the location where said first continuous surface engages said post, first connector means for connecting said first continuous surface with said post at a first location, and second connector means for connecting said second continuous surface with said post at a second location axially spaced apart from said first location.

16. A steering assembly as set forth in claim 15 wherein said first continuous surface extends axially along said post for a first distance and said second continuous surface extends axially along said post for a second distance which is substantially greater than said first distance.

* * * * *